Oct. 16, 1956 W. V. GOODHUE ET AL 2,766,779

REPLENISHING MEANS FOR LOOMS

Filed May 4, 1953 9 Sheets-Sheet 1

INVENTOR.
WILLIAM V. GOODHUE
ROBERT E. MORTON
BY
Rodney C. Southworth
ATTORNEY

INVENTOR.
WILLIAM V. GOODHUE
ROBERT E. MORTON
BY
Rodney C. Southworth
ATTORNEY

Oct. 16, 1956 W. V. GOODHUE ET AL 2,766,779

REPLENISHING MEANS FOR LOOMS

Filed May 4, 1953 9 Sheets-Sheet 3

INVENTOR.
WILLIAM V. GOODHUE
ROBERT E. MORTON

BY Rodney C. Southworth

ATTORNEY

Oct. 16, 1956 W. V. GOODHUE ET AL 2,766,779

REPLENISHING MEANS FOR LOOMS

Filed May 4, 1953 9 Sheets-Sheet 4

INVENTOR.
WILLIAM V. GOODHUE
ROBERT E. MORTON

BY Rodney C. Southworth

ATTORNEY

INVENTOR.
WILLIAM V. GOODHUE
ROBERT E. MORTON
BY
Rodney C. Southworth
ATTORNEY

REPLENISHING MEANS FOR LOOMS

Filed May 4, 1953 9 Sheets-Sheet 6

INVENTOR.
WILLIAM V. GOODHUE
ROBERT E. MORTON
BY
Rodney C. Southworth
ATTORNEY

REPLENISHING MEANS FOR LOOMS

INVENTOR.
WILLIAM V. GOODHUE
ROBERT E. MORTON
BY
Rodney C. Southworth
ATTORNEY

Oct. 16, 1956 W. V. GOODHUE ET AL 2,766,779

REPLENISHING MEANS FOR LOOMS

Filed May 4, 1953 9 Sheets-Sheet 8

INVENTOR.
WILLIAM V. GOODHUE
ROBERT E. MORTON

BY Rodney C. Southworth

ATTORNEY

REPLENISHING MEANS FOR LOOMS

Filed May 4, 1953 9 Sheets-Sheet 9

INVENTOR.
WILLIAM V. GOODHUE
ROBERT E. MORTON
BY
Rodney C. Southworth
ATTORNEY

United States Patent Office 2,766,779

Patented Oct. 16, 1956

2,766,779

REPLENISHING MEANS FOR LOOMS

William V. Goodhue, North Kingstown, and Robert E. Morton, Warwick, R. I., assignors to Universal Winding Company, Cranston, R. I., a corporation of Massachusetts Application May 4, 1953, Serial No. 352,862

28 Claims. (Cl. 139—247)

This invention pertains to replenishing means for automatic, bobbin-changing looms for weaving, and more particularly to a battery or magazine for a supply of filling wound yarn packages and improved mechanism functioning therewith for controlling the end of filling of a package being transferred during and after replenishment, and for disposing of that end and of the end of filling left attached to the cloth selvage from the substantially exhausted package ejected from the loom shuttle.

This application is a continuation in part of our copending application Serial No. 159,814 filed May 3, 1950, now United States Patent No. 2,638,936.

It is a general object of the invention to devise a mechanism for controlling the end of thread of a filling package as that package is transferred to the shuttle of a loom upon replenishing the supply of filling in the shuttle, and of controlling and disposing of that thread end and of the thread end left from the substantially exhausted supply ejected from the shuttle without interference between the two.

It is a specific object of the invention to provide a battery or magazine for filling wound packages from which packages may be transferred in sequence as required at the shuttle of the loom and appurtenant mechanism by which the end of filling from a supply being transferred may be held and so positioned and controlled as to become threaded in the eye of the shuttle quickly and positively as soon as the shuttle is picked.

A further object is that of providing a resilient influence upon the filling so that it may not be unduely strained as transfer is effected or as the shuttle is picked.

It is a further object of the invention to provide attendant devices which shall function to control the end of filling thread from the transferred supply and also that left from the ejected, substantially empty package so that they may be quickly disposed of without interference between the two and while avoiding any possibility of one or both being drawn into the fabric.

Other objects will become apparent from the following more detailed disclosure.

In looms of the automatically replenishing type in which the replenishment is effected by bobbin-changing, a so-called transfer mechanism forming a part of the loom serves upon substantial exhaustion of filling in the shuttle, to eject the exhausted bobbin and to replace it with a full one while the loom is in operation. The supplies are normally held in a rotary battery or magazine in which they are placed, one at a time, and whereon an end of each package is drawn out and fastened to be held until and after the bobbin transfer has been effected.

In accordance with practice as described in the parent application, above noted, a loom may be provided with an automatically functioning filling winder controlled to wind and supply bobbins at least as fast as required by the loom. For purposes of this invention wound bobbins from such a winder or from some other source are conveyed or in some convenient way deposited in a magazine or battery from which the leading bobbin may be transferred when required. The end of thread on each bobbin held in such a battery is automatically or otherwise so manipulated as to be drawn off for a short distance and held in a rotary or other retaining means pending transfer of a bobbin to the shuttle.

In practicing the invention a bobbin is transferred to the shuttle, the thread end is first gripped by a retractable clamp and drawn rearwardly by a clamp and a retaining hook to hold the end firmly and in a position so disposed, both as to height and to alignment with the shuttle flight as it is picked, that the filling will quickly and positively thread in the shuttle eye. Of course, as the new supply is inserted in the shuttle the nearly empty bobbin is expelled, the thread thereon and extending to the last pick in the fabric being cut and held as usual in a cutter and binder, e. g., the usual Stafford cutter. These held ends, one extending from the selvage to the cutter and the other from the selvage to the retractable clamp are, a few picks later, cut at the selvage and by the aid of certain novel controlling influences brought into a suction means by which they are exhausted to a container or other means in which they may be gathered.

A novel tension relieving means is also provided for absorbing some of the strain suddenly thrown on the filling at transfer and at the initial pick after replenishment.

The invention will now be described in detail by reference to certain physical forms it may take as illustrated in the accompanying drawings, wherein.

Figure 1:
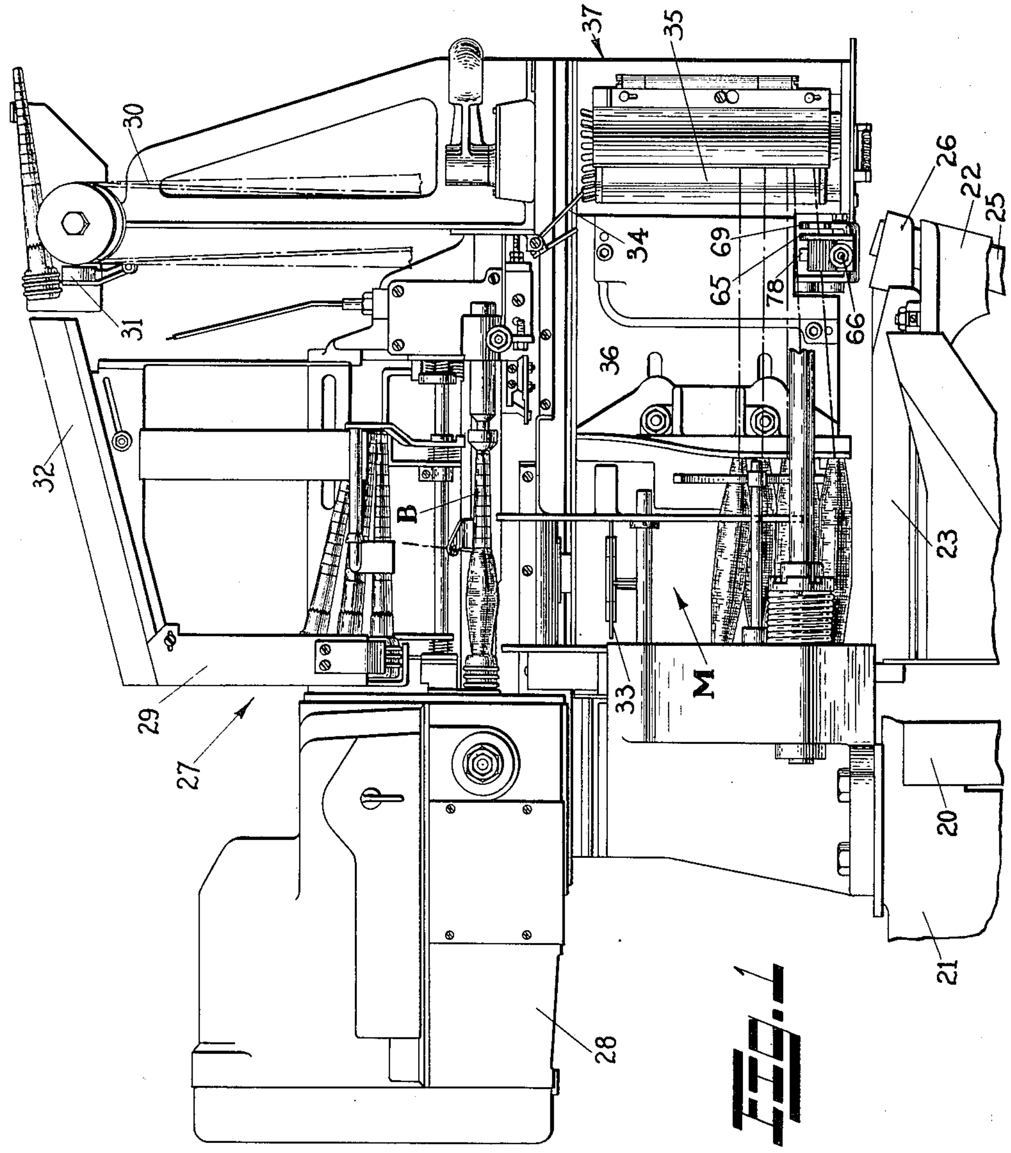
Fig. 1 is a front elevation of one end of a loom and of winding means thereat, to which the invention has been applied.
Figure 2:
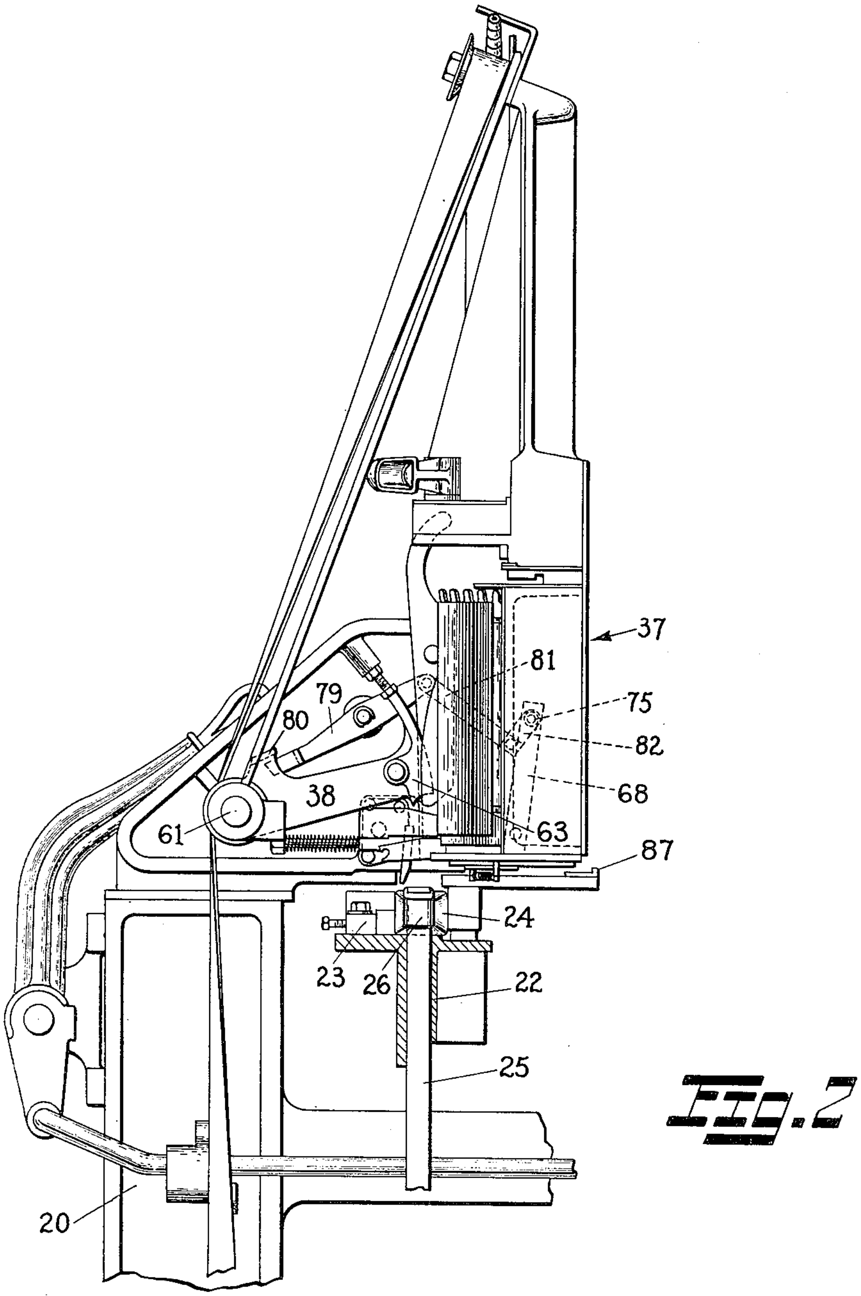
Fig. 2 is an end elevation of that mechanism shown in Fig. 1.
Figure 3:
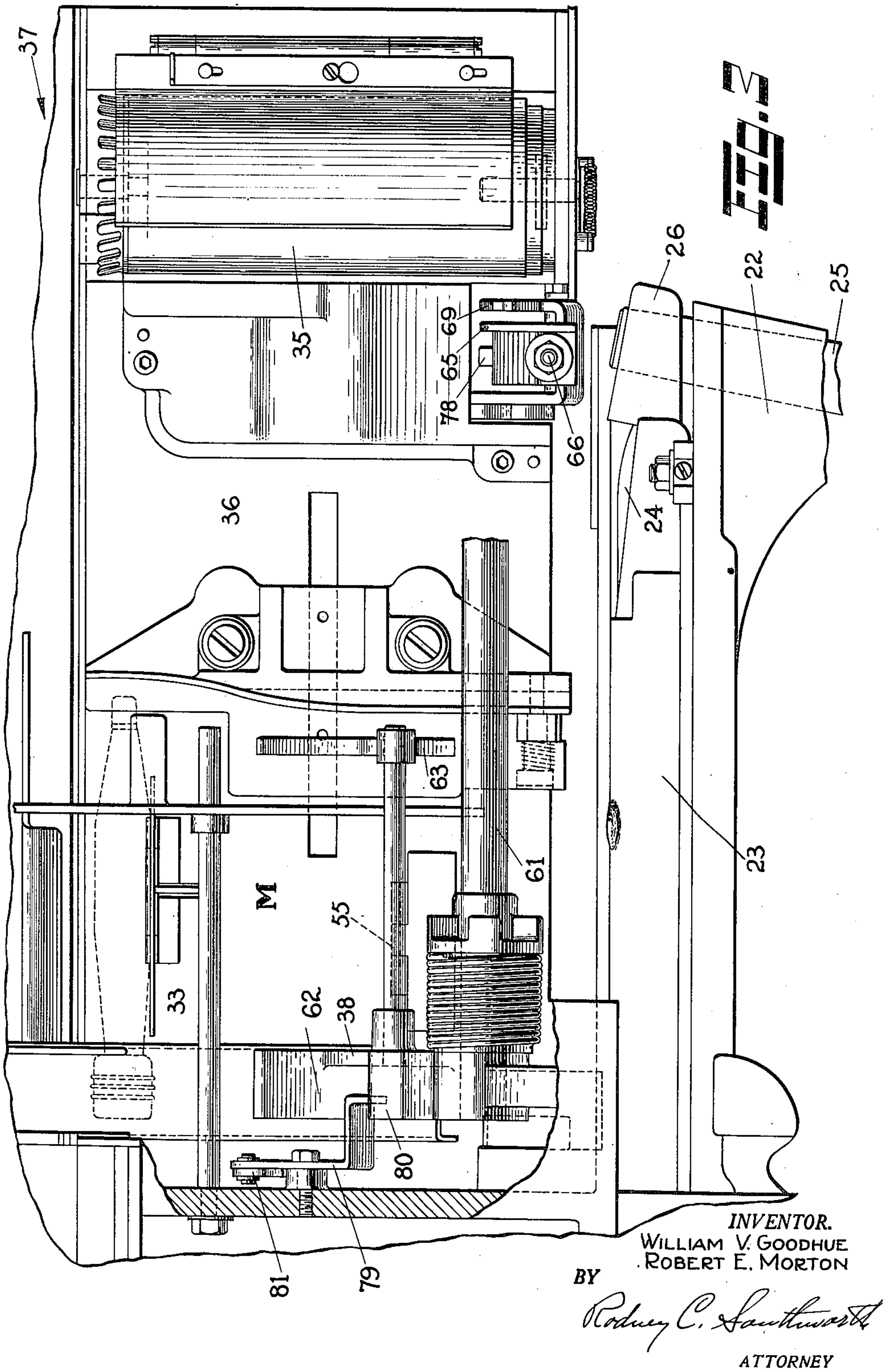
Fig. 3 is a view showing to a larger scale, a part of the mechanism of Fig. 1.

Now referring to Figs. 1, 2 and 3, a more or less conventional, fly shuttle loom having a loomside 20, front girt 21 and lay means including a lay end 22 and shuttle box 23, is adapted to pick a shuttle 24 to and fro by picking mechanisms including a picker stick 25 and picker 26. These parts are shown to illustrate the association of parts of the loom and an automatic pirn winder generally indicated by numeral 27 which has been applied thereto.

This winder comprises a power and driving unit 28 which is adapted to rotate a bobbin B held in centers and a chucking means for winding thereon a thread which is first controlled to build the usual feeler bunch and thereafter to wind a filling package. A supply of empty bobbins is maintained in an empty bobbin holder 29, said bobbins being elevated from a stripper (not shown) by a belt 30 and a magnet 31 carried thereby which retains a bobbin by its rings to raise it to the entrance chute 32 through which it passes to fall into the empty bobbin holder.

The winder may function to wind bobbins faster than they are required at the loom, but, of course, winding is started and stopped according to control from a part of the device later to be described. The wound bobbins are temporarily detained upon a rest or shelf 33 while a transfer-tail is held by a gripper 34 above the drum 35 and attached thereto by the accelerated rotation of the latter, the end having been inserted under gripper 34 by a reciprocating clip means and being held at drum 35 all in a manner described in the parent application.

Figures 5, 6, 7:
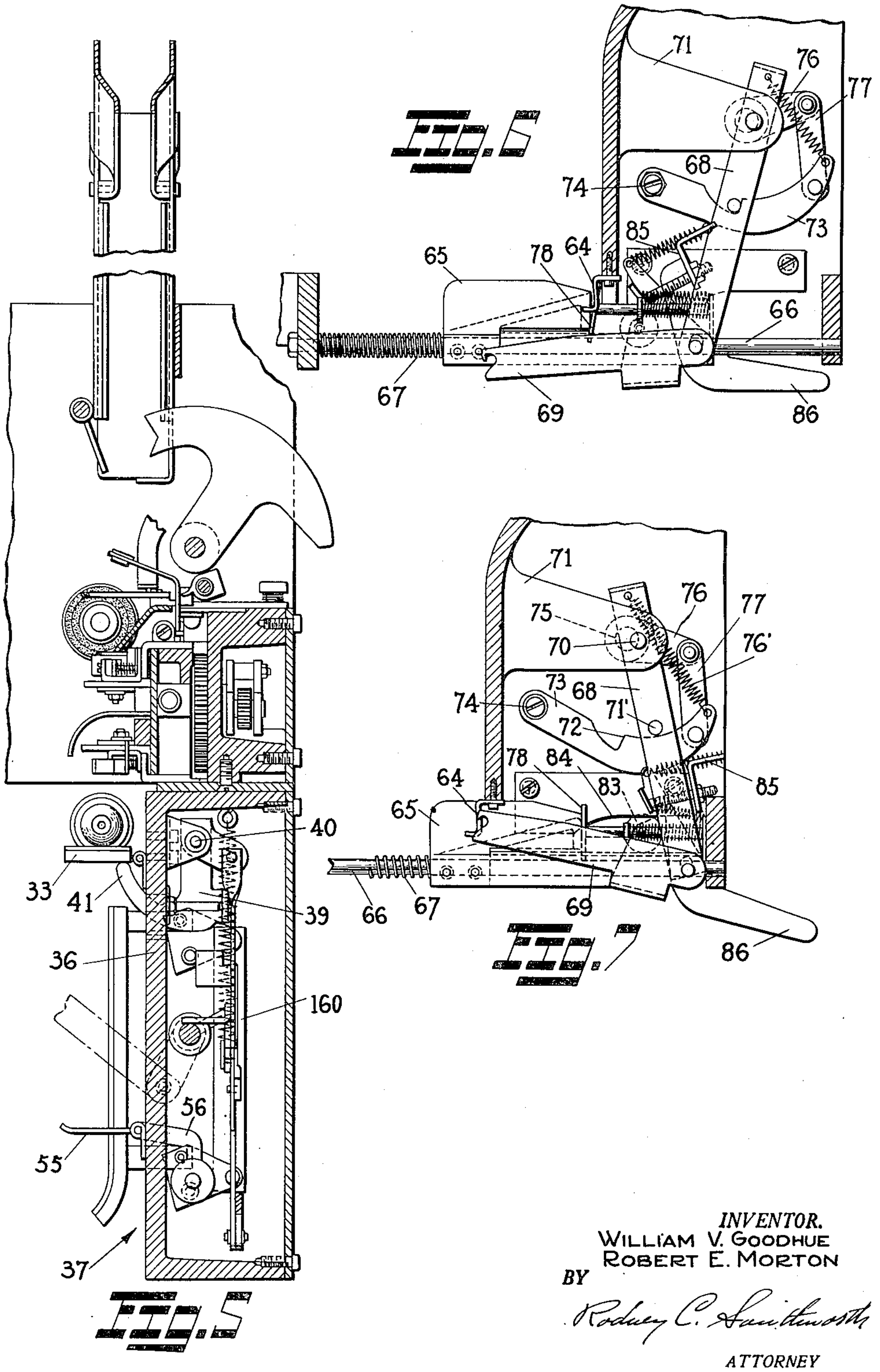
Fig. 5 is a section taken at line 5—5, Fig. 4.
Figs. 6 and 7 are sectional views taken at lines 6—6, 7—7, Fig. 4, illustrating certain retractable means in its extreme positions.

The shelf 33 is hinged to the vertical back wall 36 of the magazine which is the forward wall of the casing generally indicated by numeral 37, Fig. 5, to adapt it to swing downwardly, to release the bobbin and to allow it to drop down into the magazine. The wound bobbins are thus supplied to the magazine in overlying relationship with the lowermost bobbin slightly forward of the others to position it to be transferred to the shuttle by a transfer hammer 38, Figs. 2 and 3.

The bobbin-detention shelf 33 is maintained raised in horizontal position by means of a lever 39 pivotally supported on a shaft 40 within the casing 37 and formed with a curved finger 41 projecting through an opening in the forward wall of the casing with its end engaging the under side of the shelf, Fig. 5. The lever 39 is held in the position shown in that figure with the shelf raised by means of a spring 42 on shaft 40, Fig. 4. After a relatively short interval the doffed bobbin is released from the shelf 33 by the action of mechanism contained in casing 37, Fig. 4.

A three-armed, bell-crank lever 43 (other functions of which are set forth in the parent case) has one of its arms 44 carrying a pin 45 engageable through a slot 46 in a vertical link 47. The upper end of the link 47 is pivotally connected to an arm 48 reaching outwardly from the lever 39 which supports the shelf 33. When the drum-accelerating lever 49 is swung to the left by the travel of the carriage 50, at which time pin 51 projecting from the carriage strikes rod 52 and moves it to the left so that collar 53 engages and moves the said lever, a connecting link 54 will rock the bell-crank lever 43. The latter then causes link 47 to be raised thereby to rock lever 39 to withdraw its curved finger 41 from under the shelf 33. The shelf is thereupon allowed to swing downwardly to release the bobbin held thereon and cause it to drop by gravity in the magazine 37.

Clamping means, hereinafter described, are provided for engaging the butts of the bobbins to hold them from turning in the magazine, the clamp being released automatically to permit the bobbins to slide down in the magazine as each lowermost one is transferred to the shuttle of the loom.

To prevent the bobbin released from the tilted detention-shelf or rest 33 from becoming canted as it drops in the magazine a second rest or shelf 55 is arranged below the shelf 33, see Figs. 3 and 5. The shelf 55 is hinged to the wall of the casing 37 and is counterbalanced by a weighted arm 56 projecting through an opening in the wall and adapted normally to maintain the rest in horizontal relationship. When a bobbin drops on the shelf 55 it will overbalance the weighted arm 56 and cause the shelf to swing downwardly and release the bobbin to drop toward the bottom of the magazine while leveling and positioning it for proper transfer to the shuttle.

The bell-crank lever 43 which operates the lever 39 to release the detention-rest or shelf 33 also has another function, namely, to arrest the operation of the winding means when the magazine M becomes filled with a prescribed number of bobbins. That is accomplished through a switch 57 and lever 58, the latter being connected to arm 59 of the bell-crank lever and also pivoted on a pin 60 passing through a slot in the arm. The details and function of these parts are described in the parent application and since that is not subject matter with which the present specification is directly concerned further detail will not be given here.

The supply of bobbins is maintained, either from a winder or from some other source, and as the loom continues in operation, a bobbin will be transferred to the shuttle as replenishing of the filling is required. That is accomplished whenever a feeler such as the well known Midget feeler indicates near exhaustion of a filling supply in the shuttle whereupon that indication is carried through means known to those skilled in the art to set a transferrer latch finger for engagement by a bunter on the lay. When thus set, a forward movement of the lay rotates the transfer hammer 38 about its pivot 61 thereupon bringing the bobbin engaging members 62 and 63 into engagement with the bobbin to drive it from the magazine M into the shuttle 24. The empty bobbin is expelled from the shuttle and novel means is provided for control of the thread end, both that of the ingoing and that of the outgoing bobbins.

Now referring to Figs. 3, 4, 5, 6, and 7, the end of the filling, herein called a transfer-tail, from the bobbin in transferring position is held by a finger 64 which cooperates with a reciprocable yarn-clamp 65, the finger acting to locate the yarn for entering it between the jaws of the clamp. The jaws of the clamp are open when the slack end of the yarn is drawn thereinto while the bobbin is being transferred into the shuttle. The clamp 65 is slideable on a horizontal rod 66 and normally held in the position illustrated in Fig. 6 against the tension of a spring 67 surrounding the rod. For this purpose a latching or cocking means comprises a lever 68 pivoted to a rockable arm 69 on the side of the clamp 65. The lever 68 is pivoted at 70 on a support 71 extending from casing 37 and carries a pin 71′ engageable in a notch 72 in a latching lever 73 pivoted on a stud 74. Carried at the end of a rockable rod 75 is an arm 76 connected by a link 77 to the curved free end of the latching lever 73. The rod 75 is connected to be rocked by the transfer hammer 38, Fig. 2, to cause it to rotate the arm 76 and depress the locking lever against spring 76′ to release the lever 68. By this unlatching action the clamp 65 is released to slide toward the back of the loom on rod 66 under the force of spring 67. As the clamp 65 starts to slide a movable jaw 78 is swung against the forward part of the clamp to grip an end of the filling thread entered therebetween. This action takes place as a bobbin is being transferred into the shuttle 24, Fig. 2.

In this figure there is shown a lever 79 which is rocked by the transfer hammer, or an extension 80 forming a part thereof, and which, through a link 81 connected to an arm 82 on rod 75, controls the latching means of Figs. 6 and 7.

The transfer-tail clamp 65, when arm 68 is unlatched, is thus slid into position by the spring 67 to align the filling held therein with the eye of the shuttle for threading it therethrough. As the clamp 65 is slid to the position shown in Fig. 7, a roller 83 carried thereby travels along an arcuate track 84 to cause it to rock a lever 85 and depress a finger 86. The finger 86 is thus carried down into position to be struck by a bunter 87 on the lay, Fig. 2, at the next succeeding forward stroke of the lay thereby to restore the clamp to normal position, Fig. 6, and cause it to be latched against the pressure of its spring 67. It will be understood that the sliding yarn clamp 65 first aligns the transfer-tail with the eye of the shuttle at the start of the picking motion and when the lay reaches front center the transfer-tail is forced under two stationary hooks and held in position to allow the temple thread cutter (not shown) to cut the end at the selvage. After the end has been severed it is dropped into a thread clearer of any suitable type, or one of novel design as hereinafter described. The clearer takes up the severed end, pulls it from the clamp 65 which, incidentally, will have been opened as it has returned to receive the transfer-tail of the next bobbin to be transferred.

With the present improved construction of the transfer-tail clamping means the yarn is aligned more accurately with the eye of the shuttle at the start of the picking motion and the bobbin is actually seated in the shuttle before the end is clamped tightly, thus obviating danger of filling breakage at transfer.

It will be understood that as a full bobbin is transferred into the shuttle it will force the exhausted bobbin out, and coincidentally therewith, a thread cutter and binder, e. g., the well-known Stafford thread cutter (not shown) will cut the filling from that bobbin and hold the end thereof extending to the selvage. This end is also cut at the selvage by the usual temple thread cutter and is later cleared upon opening the cutter at a subsequent replenishing operation. As the ejected bobbin leaves the shuttle it descends into a bobbin chute and thence to a stripper in the event the bobbins are to be recycled through an automatic winder as herein shown, but otherwise to any convenient receptacle therefor.

Figure 8:
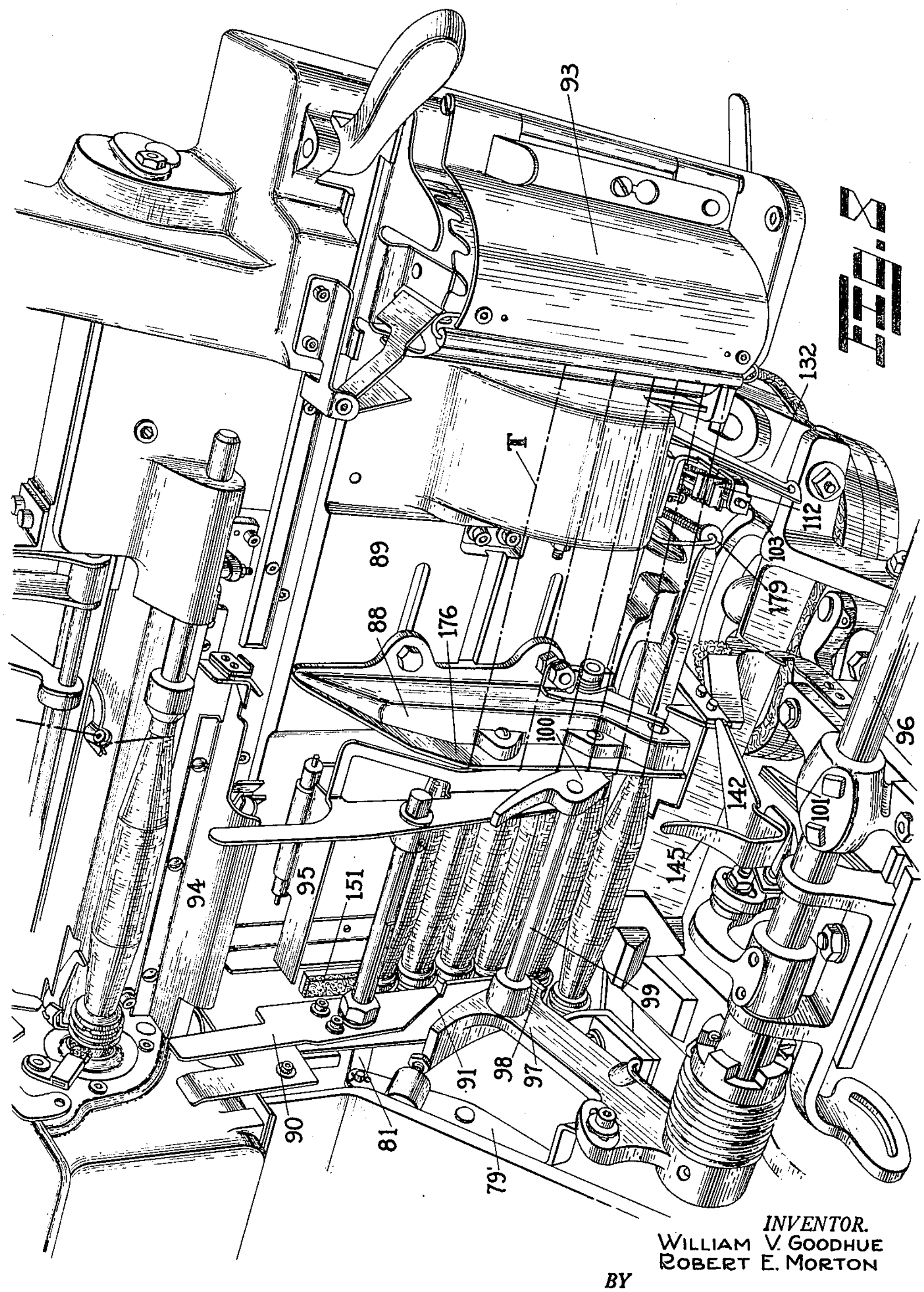
Fig. 8 is a perspective view of the battery and attendant parts positioned as they are just before replenishment.

Now referring to Figs. 8–16, a modified form of the invention will be described. In Fig. 8 the showing is somewhat confined to the battery or magazine, a number of wound bobbins therein and parts which control the transfer-tails of the filling on those bobbins as well as the parts which control the filling at transfer and subsequently thereto. The wound filling packages are held within vertically disposed guideways in the magazine defined by the slotted end guide 88 bolted to casing 89 and a slot for the bobbin butts formed by plates 90 and 91 and a spring pressed member shown in detail in Fig. 21. The bottom package is in position for transfer.

The tails T, one at each package, are held at a rotating drum type end holder 93 similar to that heretofore mentioned. At the top of the figure a wound package is held in readiness for release to drop to shelf 94 from which it will roll forwardly and then down to the detention rest or shelf 95 similar to that at 33 previously described.

A shaft 96 mounts several parts including a transfer hammer arm 97 at the end of which is the usual hammer 98 and a rod 99 to the opposite end of which is fixed a bobbin engaging member 100. This shaft also pivots a cutter and binder, e. g., the well known Stafford cutter indicated by numeral 101 which functions to enter a slot at the side of the shuttle and cut and hold the end of filling from the last inserted pick just before transfer of a fresh supply to the shuttle. The mechanism for causing these parts to function and the mode in which they operate is well known to those skilled in the art and needs no further description here.

At the lower right hand end of the figure there is provided an improved thread end holding clamp, a hook and a tension relieving means the details of which will be described in full. As in the form of the invention above described, the clamp is actuated just before transfer of a bobbin to grip the end or transfer-tail from the package on that bobbin and to move it rearwardly to a position in which it aligns more advantageously with the line of shuttle flight thereby to be threaded in the shuttle eye more quickly and with certainty. This motion also pulls the end at least partially from the holding drum 93. The hook engages the end to push it forwardly later.

Figure 10:
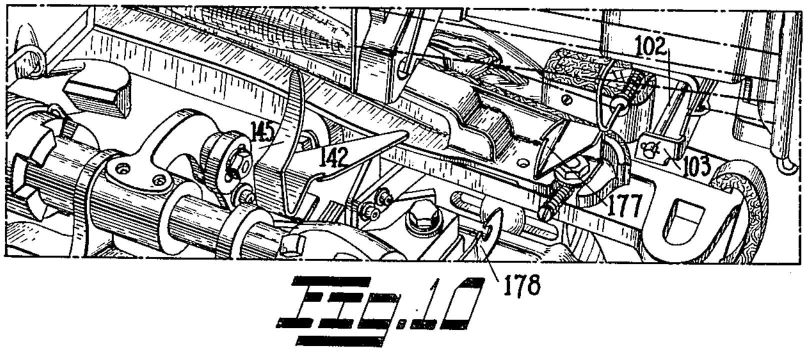
Figure 11:
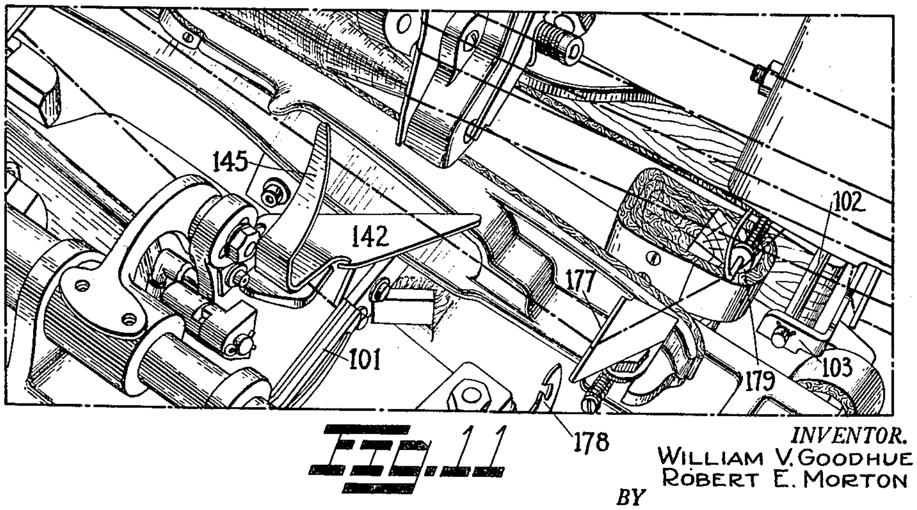
Figures 12, 13, 14, 15, 16:
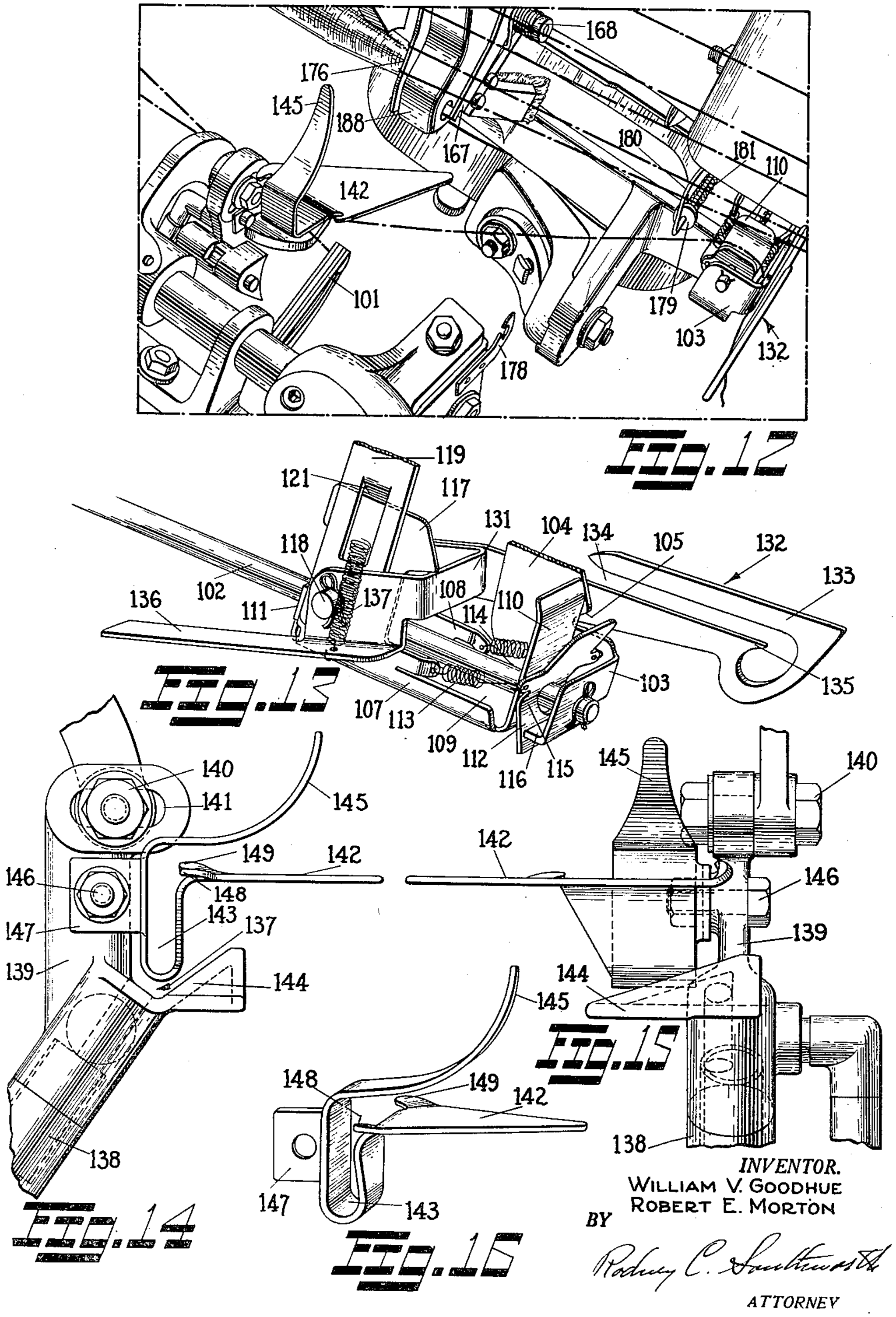
Fig. 13 is a perspective view of one form of transfer-tail clamp and hook.
Figs. 14 and 15 are elevational views of parts of a thread clearer.
Fig. 16 is a perspective detail view of a thread guide used at the thread clearer.

Referring to Figs. 8–12 and especially Fig. 13, the clamp is slideable on a rod 102 which is, in turn, supported at its forward end by a holder 103 which extends angularly to the rear and then upwardly as at 104 to bolt to some fixed part of the casing 89. This part 104 is notched at 105 for a purpose later to be described. At the rear the rod is held in a part of the casing at 106, Figs. 17 and 18.

The clamp itself comprises a box-like pressed structure with sides 107 and 108, bottom 109, a front wall 110 and rear wall 111. These latter are perforated to slide on rod 102. The front wall 110 comprises the fixed part of the clamp which functions in cooperation with a tilting member 112 spring urged to clamping relationship by springs 113 and 114 connected to ears pierced to receive hooked ends of these springs, one set at the side members 107 and 108 and the other extending laterally from the part 112 above a bearing crease 115. A lip 116 which is a part of the fixed bracket 104 serves when the clamp is moved forwardly, to open it against the tension of springs 113, 114.

Side wall 107 of the clamp extends upwardly at 117 and, with a shorter extension at the side 108, supports a pivot pin 118. A depending arm 119 similar to arm 68 of the first disclosed form of the invention, is pivoted at 120, Figs. 17 and 18, and by its slotted lower or free end, engages pin 118 to move the clamp and attendant parts along rod 102 in a manner to be described. Arm 119 has a struck-out portion 121 by which it more securely engages both sides of extension 117.

Figure 4:
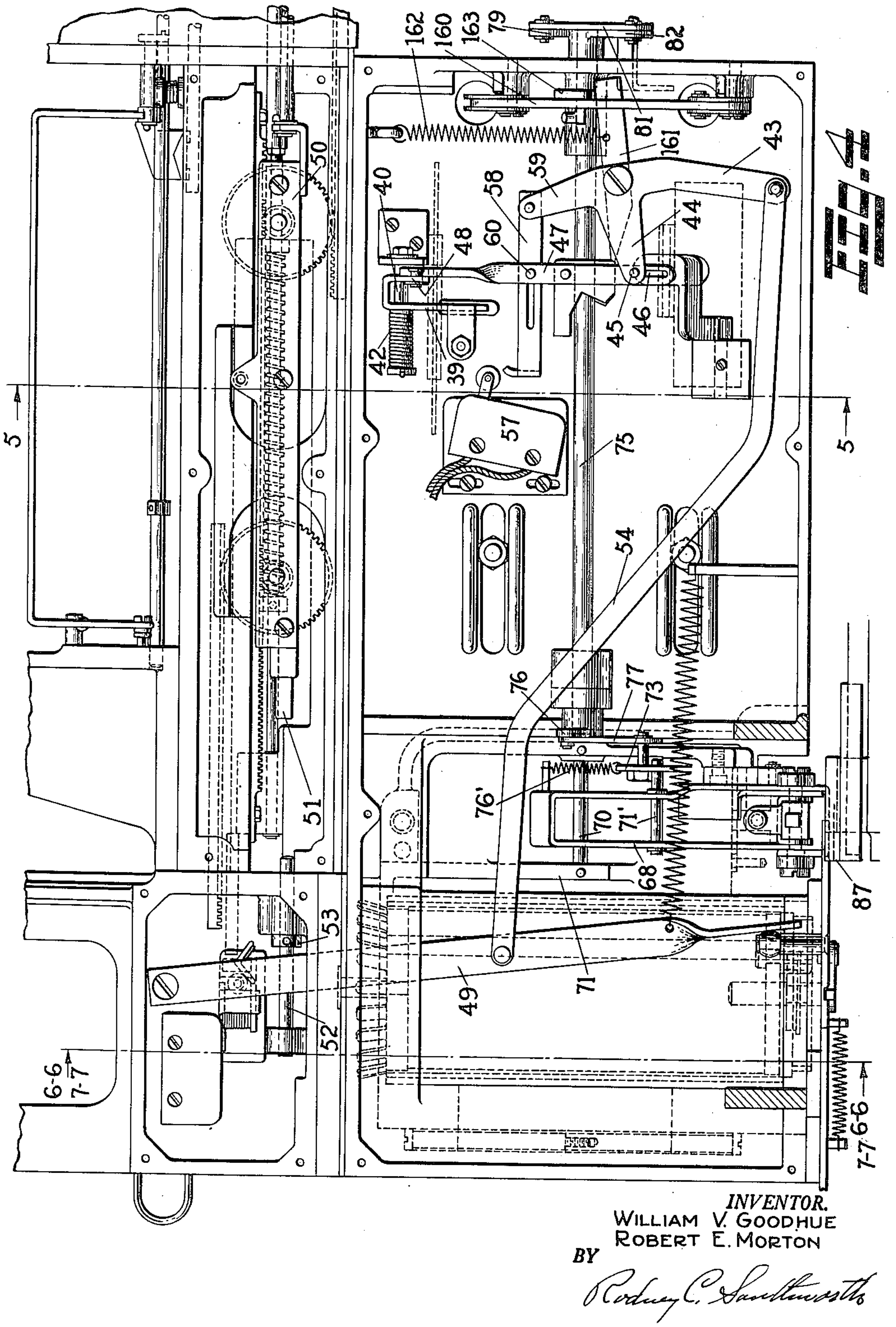
Fig. 4 is an elevation taken from the back of the device showing certain control means.
Figure 17:
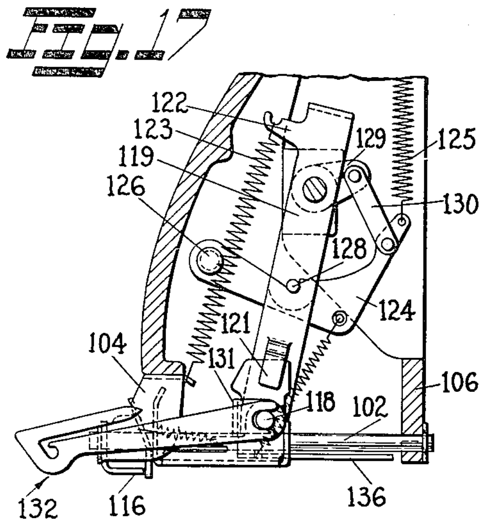
Figs. 17 and 18 are sections showing extreme positions of the transfer-tail clamp and its control means.
Figure 18:
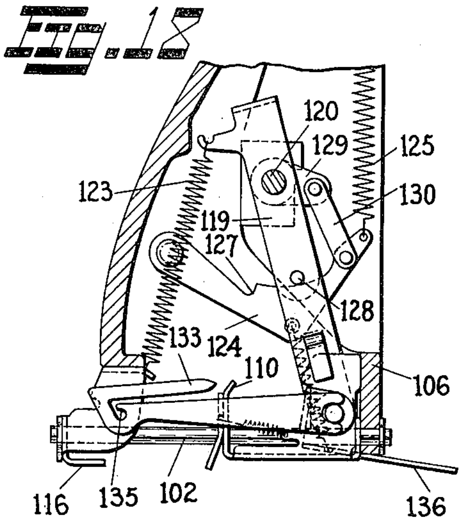

Now referring to Figs. 17 and 18, the pivot 120 in this form of the invention is actually the horizontal shaft by which parts of the mechanism are cyclically controlled and corresponds to the shaft 75, Figs. 2 and 4. Arm 119 carries an extension 122 hooked as shown and to which is connected a spring 123 attached at its other end to a bent prong at the top of bracket 104, or to some other convenient fixed element. This spring urges the arm and clamp rearwardly, Fig. 18. However, they are normally retained in forward position, Fig. 17, by a latch 124 biased to latching position by spring 125 connected to the free end of the latch and to some fixed member at the upper part of the enclosing casing. Latch 124 is pivoted at 126 and is notched at 127 to retain a pin 128 projecting from arm 119. At times this latch is released as shaft 120 is turned, this shaft having fixed to it an arm 129 connected to the end of the latch by link 130. As soon as the latch is released the clamp moves rearwardly under influence of spring 123, the clamp member 112 no longer being pressed against lip 116, closes by springs 113, 114.

The transfer-tail trapped in notch 105 and held in the clamp is at the same time caught by a hooked member presently to be described, for the purpose of pushing the tail forwardly and downwardly later. As seen in Figs. 13, 17 and 18, a yoke 131 straddles the clamp and arm at pin 118, being pivoted thereat; it mounts an elongated hook generally indicated by numeral 132. This hook has what, for convenience of terms, may be called an outer hook 133 with entrance for thread at 134 and an inner hook 135, the latter being oppositely directed to the former. In effect, this is a "hook within a hook," the first being for the purpose of entrapping the thread and leading into the second which, when the parts move forwardly, pushes the tail into other elements by which it is eventually removed from the vicinity of the battery. This forward motion is accompanied by one in a downward direction which leads the end out of the rotary end holder. At the opposite side of yoke 131 from that at which the hook is attached there is provided a rearwardly extending finger 136 which serves two purposes. It has connected to it a spring 137 attached at its upper end to the latch 124. This spring is, in effect, an over-center device which, when the parts move forwardly, Fig. 17, lowers the hook and elevates finger 136. Conversely, in rear position the spring is shifted to the opposite side of center 118 and then raises the hook and lowers finger 136. In this rearmost position the transfer-tail held in notch 105 is forced to enter inner hook 135 and the finger 136 is in position to be engaged by an abutment such as that at 87, Fig. 2, to reset the parts as the lay moves forwardly after replenishment. At that time the abutment pushes on finger 136 and moves the parts to a point where the notch in latch 124 engages pin 128.

The shaft 120 is operated at transfer in the same manner described with respect to shaft 75, that is, by a lever 79', Fig. 8, a counterpart of lever 79, Fig. 2. It does not appear necessary to describe that mechanism since it is identical with that previously disclosed.

Now referring to Figs. 8 and 14–16, the transfer-tail from a filling supply and also the end of filling cut from the ejected empty bobbin are disposed of by means therein shown. As is well known, these ends are cut from the selvage of the fabric by a temple thread cutter and the end from the exhausted supply is cut and held in a Stafford type cutter until the next subsequent replenishment of filling. Preferably, suction is used and, as shown in Figs. 14 and 15, is induced at an inlet 137 to a thread discharge tube 138 by any convenient means. Such suction systems are generally old, but according to the present invention, novel guide means is employed to keep the thread ends separated and to permit separate discharge of each through the same tube. A guide for accomplishing that purpose is attached at bracket 139 by which the entire thread clearer assembly is adjustably maintained in position. The bracket attaches to some convenient, fixed part of the loom by bolt 140 passing through a slot 141 in the bracket.

The guide itself is preferably fabricated of sheet metal and comprises a central plate 142 bent downwardly and then carried upwardly to form a gullet or channel 143, the external face of which serves in cooperation with an inclined guide 144, a part of the entrance structure of the tube, to guide the end held in the Stafford cutter into the tube once it has been severed at the selvage.

This guide, after being continued up past the level of plate 142 is formed into a finger 145 and is bent to extend in the general direction of said plate, but curved upwardly to form a divergent entrance into which the transfer-tail is received. That tail after entering between elements 142 and 145 falls into channel 143 assisted by the inflowing air in that vicinity, and when cut at the selvage is drawn into the tube and discharged. At that time it will have been drawn from the end holder and released by clamp members 110, 112, although it will perhaps still lie in the clamp and pass through inner hook 135.

The guide is held in place by bolt 146 passing through a lug 147 bent from the guide material and bolted to the side of bracket 139.

In some instances tabs 148 and 149 are struck from the plate 142 in a position to prevent return movement of the thread once it has entered the channel 143.

Referring to Figs. 19–22, certain novel features at the battery are shown. The battery generally evident in Fig. 8 and others, is, in effect, a chute formed by the front wall of the casing 89, end guide 88 and plates 90 and 91. These latter cooperate with a movable presser to hold the butts 150 of the bobbins against turning or movement except at such times as a transfer of the leading bobbin to the shuttle is effected. The presser comprises a vertically disposed member 151 curved as at 152 at its lower end to impart to the bobbins that pathway needed to set the leading one forward in transfer position. Preferably the member 151 is faced with felt, sponge rubber or similar material 153 of soft resilient nature. That compresses against the bobbin butts and holds them against motion, but allows for easy control to release when desired.

Member 151 is carried as a part of extensions 154, 155 passing through holes in casing 89. These extensions connect to vertical arms of bell crank levers 156, 157 pivoted at 158, 159 and controlled by a link 160 connected to the ends of the horizontal arms of said levers. Similar mechanism has been shown in the first form of the invention and, although there are slight differences, this description treats them as one. The link 160, Fig. 4, is controlled by arm 161 normally held in a position to maintain the presser in contact with the bobbin butts by a spring 162. When transfer is effected, an arm 163 fixed to shaft 75 or 120 as the case may be, engages arm 161 pulling it down against the tension of spring 162. The link 160 is slotted as shown to provide lost motion since the link need not move as far as arm 163 would otherwise move it.

The foremost bobbin in the chute is held against the usual bobbin guide 164 and by a spring positioned detent 165. This latter may be pushed out of the way by the bobbin butt at transfer, but quickly snaps back to position to check the remainder of the bobbins moving down under influence of gravity.

Figures 19, 20, 21, 22:
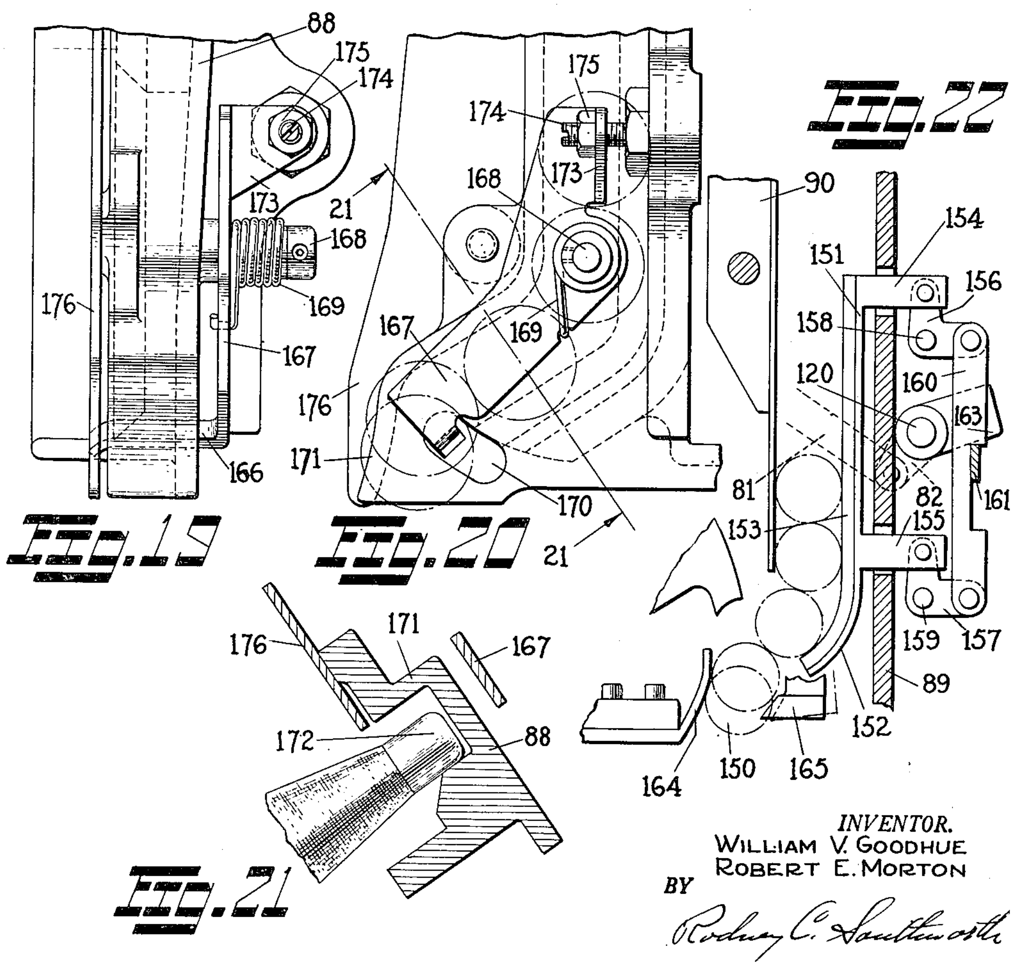
Fig. 19 is a front elevation of a detent for holding the bobbins at their tip ends.
Fig. 20 is a side elevation of the mechanism of Fig. 19.
Fig. 21 is a section at line 21—21, Fig. 20.
Fig. 22 is a section showing the means for holding bobbins at their butt ends and the mode of operation therefor.

The bobbin tips are guided in a channel in the member 88 and the tip of the leading one is held against a detent 166 at the end of lever 167 pivoted at 168 and urged by coil spring 169 to the position of Figs. 19 and 20. Detent end 166 passes through a slot 170 in the guide casting and forms a converging restriction in cooperation with channel wall 171 into which the tip 172 of a bobbin is received. The lever 167 extends to the other side of the pivot to be laterally bent into an ear or lug 173 through which is threaded a stop screw 174 maintained in adjusted position by lock nut 175. A plate 176 extends forwardly and serves as a guide about which the transfer-tail ends pass as they are led to the end holder; also, this provides a smooth surface down which the ends move in following their respective packages and by which they are kept from interference with adjacent parts of the mechanism.

Figure 9:
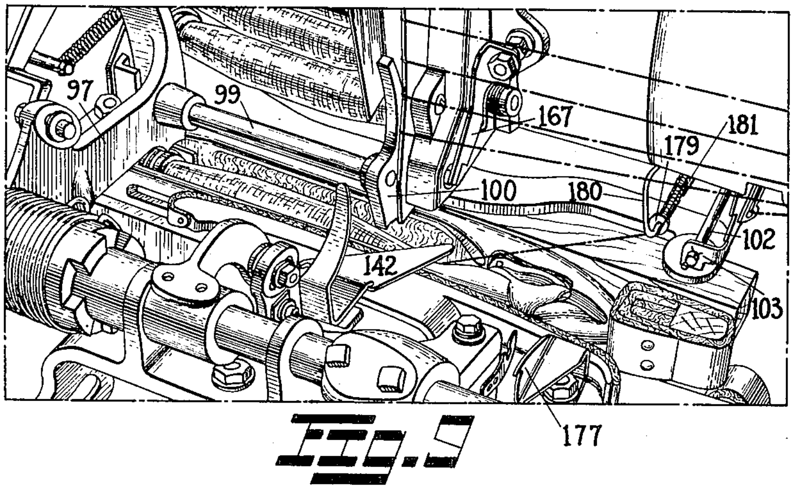
Figs. 9–12 are similar views of a part only of the mechanism of Fig. 8, showing successive positions incidental to the cycle.

Again referring to Figs. 8–12, the transfer-tail is positively moved to a position in which it enters the guide between finger 145 and plate 142 by a notched or toothed thread catcher 177. This catcher best shown in Figs. 9 and 10 is fixed to the front box plate or other convenient part of the lay and is so positioned that as the shuttle is picked after transfer and the lay comes forwardly, the tooth or notch catches the tail and pushes it forwardly into the guide whereupon it may be retained by the suction present there and by the tabs 148, 149 if the same are used. In instances a hook 178 may be attached to the loom in position to receive the tail from the catcher 177. As the latter overlaps the hook in its travel forwardly, the thread is cammed up the inclined part of the hook to snap into a notch therein whereupon it is retained as the catcher returns with the lay.

As shown in Fig. 9 and others, tension in the transfer-tail may not exceed a reasonable value since at transfer and when the clamp moves to the rear, a plastic or other button 179 freely slideable on a wire guide 180 may retract against a light spring 181 on the guide. By regulating the spring tension and travel of the button 179, tension and also the position and angle of the tail may be governed.

To review the operation briefly, it is assumed that the battery is supplied with several bobbins on each of which is wound a filling thread package and from which a transfer-tail has been extended with its end held at the holder 93. When the signal for replenishment is given through the well known feeler mechanism, the forward movement of the lay will impart a movement to transfer hammer 97, Figs. 8–12, which as it moves downwardly pushes the lowermost or leading bobbin into the shuttle, at the same time ejecting the empty one.

As that act of bobbin transfer is effected, the lever 79, or 79', Figs. 2 and 8, is rocked to affect shafts 75 or 120 through the linkage described. Those shafts connected through to latch members 73 or 124, release the transfer-tail clamp, either the form first or last described, which, in properly timed relation to the transfer and pick of the shuttle, grips the tail and moves back to the positions of Figs. 7 or 18. At the same movement, the hook members 69 or 132 will engage the tail. This drawing of the tail to the rear as it is held in the clamp pulls the end from holder 93, at least to the point where little resistance is left to its complete removal. The tail is held in the best position for threading at the shuttle eye and, during the rearward movement of the clamp and as the shuttle is picked, contact of the tail with the button 179 and tension in the thread move the button against spring 181 as is necessary to prevent excessive tension and possible thread breaking at the transfer.

As the shaft 75 or 120, is the case may be, is rocked it also controls the presser 151 to withdraw it and permit the bobbins to drop in the chute thereby to position the leading one for the next succeeding transfer.

After the shuttle has been picked, the lay moves first throughout the remainder of its travel to the rear and then to the front. As it moves forwardly the abutment 87, Fig. 2, strikes the finger 136 and pushes the clamp and all attendant parts to the front until the arms 68 or 119 are locked by their respective latches. The mechanism is then positioned for the part of the next cycle.

At that forward movement of the lay the tail is pushed into the thread clearer which functions as described to discharge the cut ends.

Figs. 8–12 show the parts as they appear with the thread ends in positions occupied at least momentarily during some of the steps which go to make up a cycle. In Fig. 8 the mechanism is merely in normal position preparatory to the start of a transfer cycle.

At Fig. 9 the transfer has just been completed with the lay starting its travel to the rear and the clamp and hook have engaged the tail to draw it toward the back, the tail being taut about button 179 forcing it rearwardly against spring 181.

At Fig. 10 the lay has moved to the rear to about the point at which the shuttle will be picked. The transfer-tail controlling parts are in positions similar to those which they occupy in Fig. 9.

Fig. 11 is further advanced, the shuttle having been picked, but the lay is still to the back so that the clamp, hook, etc., are not returned forwardly. The transfer-tail from the shuttle is being pushed forwardly to be passed into the thread clearer and will be held by the tabs 148, 149 or by hook 178, it being understood that while both are shown, only one need be utilized. The cut end held in the Stafford cutter and extending to the selvage is also in position to be cleared when severed at the selvage and when released by the cutter at the next transfer.

At Fig. 12 the ends are shown held by the parts at the suction or other clearer and also, the lay has come forwardly so that the clamp and hook are reset, the clamp being open so that the tail held therein may be released and disposed of, that end being first discharged by the air stream, then the remainder being discharged as soon as the temple thread cutter has been effective to cut at the selvage.

While certain embodiments of the invention have been disclosed, it is to be understood that the inventive concept may be carried out in a number of ways. The invention is, therefore, not to be limited to the precise details described, but is intended to embrace all variations and modifications thereof falling within the spirit of the invention and the scope of the claims.

We claim:

1. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means for gripping the transfer-tail of a package prior to transfer of that package to a shuttle and for moving said tail to a position in which it is aligned for threading in said shuttle.

2. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means and means functioning coincidentally with transfer of a package to the loom shuttle for causing the clamp to grip the transfer-tail of that package and to move it rearwardly of the loom to align it with the shuttle to facilitate threading in the shuttle.

3. In an automatic, bobbin-changing type, replenishing means for a fly shuttle loom, a battery for holding filling packages to be transferred in succession to the shuttle of the loom, means for holding a transfer-tail end from the supply of filling on each said package and a clamp normally positioned beneath the transfer-tail from the package next to be transferred to the shuttle, means for holding said clamp open for receiving the transfer-tail as it moves downwardly when the package is moved toward said shuttle, and means for retracting the clamp and simultaneously closing it to move the tail rearwardly of the loom to align it for threading at the shuttle.

4. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means, means on which said clamp may slide rearwardly of the loom, spring-urged means for moving it toward the rear and a latching means for retaining it forwardly, and control members functioning coincidentally with the transfer function for releasing said latching means thereby to cause the clamp to close on the transfer-tail and to move it to a position of threading alignment with the shuttle.

5. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means, a rod on which said clamp may slide rearwardly of the loom, an arm pivoted above said clamp and rod and having its relatively free end attached to said clamp, spring means urging said arm and clamp in a direction to move the latter rearwardly, a latching member functioning to retain said arm and clamp in a forward, open thread receiving position and means acting in response to initiation of a transfer function to release said latch.

6. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means, a rod on which said clamp may slide rearwardly of the loom, an arm pivoted above said clamp and rod and having its relatively free end attached to said clamp, spring means urging said arm and clamp in a direction to move the latter rearwardly, a latching member functioning to retain said arm and clamp in a forward, open, thread receiving position and means acting in response to initiation of a transfer function to release said latch, said means comprising a control shaft, an arm at one end thereof and a link from said arm to said latch and lever means at the other end of said shaft interconnected to the transfer hammer of said loom.

7. In an automatic bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means for gripping the transfer-tail of a package prior to transfer of that package to a shuttle and for moving said tail to a position in which it is aligned for threading in said shuttle, and a hook member movable with said clamp for engaging the transfer-tail and for pushing it forwardly of the loom after transfer has been effected and the shuttle has been threaded.

8. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means and means functioning coincidentally with transfer of a package to the loom shuttle for causing the clamp to grip the transfer-tail of that package and to move it rearwardly of the loom to align it with the shuttle to facilitate threading in the shuttle, and means for pushing the transfer-tail from a bobbin just transferred to the shuttle forwardly which comprises a hooked means movable with said clamp and having a hook within a hook, the outer of which engages and draws the tail rearwardly while the inner then entraps the tail preparatory to pushing it forwardly.

9. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means and means functioning coincidentally with transfer of a package to the loom shuttle for causing the clamp to grip the transfer-tail of that package and to move it rearwardly of the loom to align it with the shuttle to facilitate threading in the shuttle, and means for pushing the transfer-tail from a bobbin just transferred to the shuttle forwardly which comprises a hooked member having one elongated external hook with a reversely disposed hook within it, said hook being pivoted at said clamp and movable forwardly and rearwardly therewith, and over-center spring means for rocking said hooked member upwardly as the clamp and member are moved to the rear and downwardly as they approach their forward position.

10. Mechanism as defined in claim 9 wherein means is provided for holding the transfer-tail downwardly to force it into the hook by which it is pushed forwardly.

11. Mechanism as defined in claim 10 wherein the means for holding the transfer-tail downwardly comprised an abutment defining a part of a notch into which the tail moves as the clamp and hooked member move rearwardly.

12. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means for gripping the transfer-tail of a package prior to transfer of that package to a shuttle and for moving said tail to a position in which it is aligned for threading in said shuttle, and resilient means positioned betwen the clamp and battery and engageable by the transfer-tail for relieving tension therein at transfer and at the first pick of the shuttle after transfer.

13. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means for gripping the transfer-tail of a package prior to transfer of that package to a shuttle and for moving said tail to a position in which it is aligned for threading in said shuttle, and means for relieving tension in the transfer-tail at transfer and during the subsequent pick which comprises a rod, a thread restraining member slideable on said rod and spring means urging said member against the pull of the thread which constitutes the transfer-tail.

14. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means for gripping the transfer-tail of a package prior to transfer of that package to a shuttle and for moving said tail to a position in which it is aligned for threading in said shuttle and means for relieving tension in the transfer-tail at transfer and during the subsequent pick which comprises a rod, a disk slideable on said rod and positioned to be engaged by the transfer-tail between the shuttle and clamp and a spring on said rod and urging said disk in a direction resiliently to resist the pull on the said tail.

15. In an automatic, bobbin-changing type, replenishing means for a fly shuttle loom having a lay, a battery for holding filling packages to be transferred in succession to the shuttle of the loom, means for holding a transfer-tail end from the supply of filling on each said package, a retractable clamp between said battery and end holding means for holding the transfer-tail in a position to facilitate threading of the shuttle at transfer, an end clearer for receiving said transfer-tail and for disposing of said tail after it has been severed from the fabric selvage and a means carried at the lay of the loom for engaging and pushing the tail forwardly into said end clearer.

16. In an automatic, bobbin-changing type, replenishing means for a fly shuttle loom having a lay, a battery for holding filling packages to be transferred in succession to the shuttle of the loom, means for holding a transfer-tail end from the supply of filling on each said package, a retractable clamp between said battery and end holding means for holding the transfer-tail in a position to facilitate threading of the shuttle at transfer, an end clearer for receiving said transfer-tail and for disposing of said tail after it has been severed from the fabric selvage and a means carried at the lay of the loom for engaging and pushing the tail forwardly into said end clearer, said means comprising a cam-like instrumentality with a means defining a notch into which the tail is received and having a forwardly inclined rear abutment for forcing the tail toward the front of the loom.

17. In an automatic, bobbin-changing type, replenishing means for a fly shuttle loom having a lay, a battery for holding filling packages to be transferred in succession to the shuttle of the loom, means for holding a transfer-tail end from the supply of filling on each said package, a retractable clamp between said battery and end holding means for holding the transfer-tail in a position to facilitate threading of the shuttle at transfer, an end clearer for receiving said transfer-tail and for disposing of said tail after it has been severed from the fabric selvage and a means carried at the lay of the loom for engaging and pushing the tail forwardly into said end clearer and a notched means fixed at a position adjacent the end clearer for receiving the tail from the means for pushing it forwardly and for preventing its return when that said means carried by the lay is retracted.

18. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means for gripping the transfer-tail prior to transfer of the package to a shuttle for pulling it from the end holder and positioning it to facilitate threading at the shuttle, an end clearer for receiving said transfer-tail when released by said clamp and for receiving and ejecting an end of filling severed from the exhausted supply, said end clearer including as a part thereof a thread separating guide.

19. In an automatic, bobbin-changing type, replenishing means for a fly shuttle loom, a battery for holding filling packages to be transferred in succession to the shuttle of the loom, means for holding a transfer-tail end from the supply of filling on each said package and a clamp between said battery and end holding means for gripping the transfer-tail prior to transfer of the package to a shuttle for pulling it from the end holder and positioning it to facilitate threading at the shuttle, an end clearer for receiving said transfer-tail when released by said clamp and for receiving and ejecting an end of filling severed from the exhausted supply, said end clearer comprising a suction tube and guide means for causing the said ends of filling to enter the tube while separated at two levels.

20. In an automatic, bobbin-changing type, replenishing means for a fly shuttle loom, a battery for holding filling packages to be transferred in succession to the shuttle of the loom, means for holding a transfer-tail end from the supply of filling on each said packinge and a clamp between said battery and end holding means for gripping the transfer-tail prior to transfer of the package to a shuttle for pulling it from the end holder and positioning it to facilitate threading at the shuttle, an end clearer for receiving said transfer-tail when released by said clamp and for receiving and ejecting an end of filling severed from the exhausted supply, said end clearer comprising a suction tube and guide means at the entrance to said tube within which the said filling ends are received, said guide means having diverging members defining an entrance between which one filling end is received and below which the other is held by a thread cutter and binder, and a downwardly directed channel in which the upper end may pass to the suction tube.

21. Mechanism as defined in claim 20 wherein thread restraining prongs comprise a part of one of said divergent members for retaining a thread once it has entered between them.

22. In an automatic, bobbin-changing type, replenishing means for a fly shuttle loom, a battery for holding filling packages to be transferred in succession to the shuttle of a loom which comprises a bobbin holding chute with channels at each side, one for the bobbin butts and the other for the bobbin tips, the channel for the butts being defined at one side by a presser member having a surface parallel ot the bobbin butts for engaging substantially the entire length of said butts, normally holding the bobbins against movement, but retractable in a direction perpendicular to the length of the bobbins at replenishment of a bobbin in a shuttle to release the bobbins for movement toward the position occupied by that bobbin just being transferred to the shuttle, a spring pressed means at the base of each said channel for preventing unintended release of a bobbin, but movable under pressure to release the foremost bobbin only, when that bobbin is to be transferred.

23. In an automatic, bobbin-changing type, replenishing means for a fly shuttle loom, a battery for holding filling packages to be transferred in succession to the shuttle of a loom which comprises a bobbin holding chute with channels at each side, one for the bobbin butts and the other for the bobbin tips, the channel for the butts being defined at one side by a presser member which comprises a vertically disposed plate curved at its lower end and a facing of relatively compressible material disposed parallel to the bobbin butts for engaging substantially the entire length of said butts, normally holding the bobbins against movement, means operable upon transfer of a bobbin from said battery to the shuttle for retracting said presser member in a direction perpendicular to the length of the bobbins to release the bobbins for movement toward the position occupied by that bobbin just being transferred to the shuttle.

24. In an automatic, bobbin-changing type, replenishing means for a fly shuttle loom, a battery for holding filling packages to be transferred in succession to the shuttle of a loom which comprises a bobbin holding chute with channels at each side, one for the bobbin butts and the other for the bobbin tips, the channel for the butts being defined at one side by a presser member which comprises a vertically disposed plate curved at its lower end and a facing of relatively compressible material disposed parallel to the bobbin butts for engaging substantially the entire length of said butts, normally holding the bobbins against movement, means operable upon transfer of a bobbin from said battery to the shuttle for retracting said presser member in a direction perpendicular to the length of the bobbins to release the bobbins for movement toward the position occupied by that bobbin just being transferred to the shuttle, a spring pressed means at the base of each said channel for preventing unintended release of a bobbin, but movable under pressure to release the foremost bobbin only, when that bobbin is to be transferred.

25. In an automatic, bobbin-changing type, replenishing means for a fly shuttle loom, a battery for holding filling packages to be transferred in succession to the shuttle of a loom which comprises a bobbin holding chute, channels at each side of said chute, one for bobbin butts and the other for bobbin tips, means adjacent the terminal bobbin in said chute for releasing it at transfer and means intermediate the vertical extent of said chute and of the plurality of bobbins in the chute and engageable with a substantial portion of the intermediate part of each filling package as it passes, for temporarily arresting downward movement of a filling package and for leveling it prior to release for further movement.

26. In an automatic, bobbin-changing type, replenishing means for a fly shuttle loom, a battery for holding filling packages to be transferred in succession to the shuttle of a loom which comprises a bobbin holding chute, channels at each side of said chute, one for bobbin butts and the other for bobbin tips, means adjacent the terminal bobbin in said chute for releasing it at transfer and means for preventing bobbins from becoming canted as they progress downwardly in said chute which comprises a retractable shelf means engageable along a substantial portion of the length of the wound package on a bobbin for temporarily arresting a passing bobbin.

27. In an automatic, bobbin-changing type, replenishing means for a fly shuttle loom, a battery for holding filling packages to be transferred in succession to the shuttle of a loom which comprises a bobbin holding chute, channels at each side of said chute, one for bobbin butts and the other for bobbin tips, and means for preventing bobbins from becoming canted as they progress downwardly in said chute which comprises a shelf interposed in the pathway of the bobbins, means on which said shelf is pivoted and a counter weight tending to maintain the shelf in the path of bobbins but movable when a bobbin rests on the shelf to permit it to retract under the weight of the bobbin.

28. In an automatic, bobbin-changing type, replenishing means for a fly shuttle loom, a battery for holding filling packages to be transferred in succession to the shuttle of a loom which comprises a bobbin holding chute, channels at each side of said chute, one for bobbin butts and the other for bobbin tips, a means at the top of said chute for temporarily arresting bobbins prior to their entry into the chute, means adjacent the terminal bobbin in said chute for releasing it at transfer, and means intermediate said means for arresting and for releasing bobbins for leveling each bobbin as it descends in the chute which comprises a retractable shelf engageable along a substantial portion of the length of a filling package on the bobbin.

References Cited in the file of this patent

UNITED STATES PATENTS

| | | |
|---|---|---|
| 964,582 | Stone | July 19, 1910 |
| 1,115,983 | Stone | Nov. 3, 1914 |
| 1,510,765 | Chevrette | Oct. 7, 1924 |
| 1,548,399 | Wakefield | Aug. 4, 1925 |
| 1,549,238 | Wakefield | Aug. 11, 1925 |
| 1,777,357 | Geronomo | Oct. 7, 1930 |